United States Patent
Rigollet et al.

(10) Patent No.: US 8,042,234 B2
(45) Date of Patent: Oct. 25, 2011

(54) CLAMPING DEVICE WITH REINFORCED CLAMPING LUGS

(75) Inventors: Nicolas Rigollet, Romoranttin Lanthenay (FR); Fabrice Prevot, Selles sur Cher (FR); Tony Rointru, Marcilly en Gault (FR)

(73) Assignee: Etablissements Caillau, Moulineaux (FR)

( * ) Notice: Subject to any disclaimer, the term of this patent is extended or adjusted under 35 U.S.C. 154(b) by 668 days.

(21) Appl. No.: 11/911,491

(22) PCT Filed: Apr. 12, 2006

(86) PCT No.: PCT/FR2006/050341
§ 371 (c)(1),
(2), (4) Date: Oct. 12, 2007

(87) PCT Pub. No.: WO2006/109001
PCT Pub. Date: Oct. 19, 2006

(65) Prior Publication Data
US 2008/0184536 A1    Aug. 7, 2008

(30) Foreign Application Priority Data

Apr. 13, 2005 (FR) .................................. 05 03689

(51) Int. Cl.
*F16B 2/06* (2006.01)
(52) U.S. Cl. ............................. 24/280; 24/19; 285/419
(58) Field of Classification Search ................. 285/419; 24/419, 279, 280, 284, 19, 201 S
See application file for complete search history.

(56) References Cited

U.S. PATENT DOCUMENTS

| 848,139 | A | * | 3/1907 | Stuppar, G. | 138/99 |
| 1,146,813 | A | * | 7/1915 | Peterman et al. | 24/279 |
| 1,873,357 | A | * | 8/1932 | St John | 248/61 |
| 1,907,889 | A | * | 5/1933 | Stauffer | 24/483 |
| 3,558,162 | A | * | 1/1971 | Ferrai et al. | 285/93 |
| 4,708,373 | A | * | 11/1987 | Morriss, Jr. | 285/133.21 |
| 4,736,921 | A | * | 4/1988 | Zane et al. | 248/316.2 |
| 4,953,899 | A | | 9/1990 | Printiss, Sr. | |
| 5,010,626 | A | * | 4/1991 | Dominguez | 24/279 |
| 5,219,001 | A | * | 6/1993 | Rennaker | 138/99 |
| 6,145,896 | A | * | 11/2000 | Vitel et al. | 285/414 |
| 6,269,524 | B1 | * | 8/2001 | Cassel | 24/279 |
| 6,588,070 | B2 | * | 7/2003 | Tran | 24/279 |
| 6,877,191 | B2 | * | 4/2005 | Logan et al. | 24/279 |
| 7,516,522 | B2 | * | 4/2009 | Chene et al. | 24/279 |
| 2002/0166214 | A1 | * | 11/2002 | Wachter | 24/279 |
| 2004/0068847 | A1 | | 4/2004 | Belisle et al. | |
| 2004/0216284 | A1 | * | 11/2004 | Belisle et al. | 24/279 |

FOREIGN PATENT DOCUMENTS

EP    0 367 169 A1    9/1990
EP    1181477 B1    12/2004

* cited by examiner

*Primary Examiner* — Robert Sandy
*Assistant Examiner* — Michael Lee
(74) *Attorney, Agent, or Firm* — The Webb Law Firm

(57) ABSTRACT

Disclosed is a clamping device including a collar having at least one pair of projecting lugs and tightening means co-operating with said lugs. Each lug of a pair is equipped with reinforcement means suitable for opposing deformation of said lugs under the action of the tightening means. Each lug has a connection portion via which it is connected to a belt portion of the collar, which connection portion is upstanding relative to said belt portion, and a tightening wall, with which the tightening means come into engagement and which is folded back towards the belt portion. A space is formed between the connection portion and the tightening wall.

21 Claims, 7 Drawing Sheets

CLAMPING DEVICE WITH REINFORCED CLAMPING LUGS

BACKGROUND OF THE INVENTION

The present invention relates to a clamping device comprising a collar, suitable for being disposed around objects to be clamped, and having at least one pair of projecting lugs, the device further comprising tightening means suitable for co-operating with lugs of said pair to move them relative to each other in a manner such as to clause the diameter of the collar to decrease.

In particular, the tightening means are of the nut and bolt type. Collars of this type, e.g. for clamping together two smooth tubes disposed end-to-end, are known from Patent Application EP 1 181 477. Conventionally, the collar includes a belt portion relative to which the two lugs serving for tightening are upstanding. The belt portion is disposed around the object(s) to be clamped, and the lugs, which for raised lips, are disposed facing each other to define a slot between them of width that is decreased during tightening.

In the collar described in the above-mentioned patent, the lugs formed by said lips are situated in the immediate vicinity of the edges of the above-mentioned slot. Even though such collars are generally satisfactory, it has been observed that, for certain demanding applications, the tightening might lose some of its effectiveness because, firstly, the co-operation between the tightening means, in particular means having bolts, might not take place in the desired manner, in particular due to the bolts not being guided properly, and, secondly, the lugs might bend under the effect of the tightening forces.

SUMMARY OF THE INVENTION

An object of the invention is to improve that state of the art further.

This object is achieved by means of the facts that each lug of said pair has a connection portion via which it is connected to a belt portion of the collar, which connection portion is upstanding relative to said belt portion, and a tightening wall, with which the tightening means come into engagement and which is folded back towards the belt portion, and that a space is formed between the connection portion and the tightening wall.

By means of this configuration, the tightening forces are applied directly to the tightening wall, i.e. remote from the connection portion of the lug that connects the lug to the belt portion. For the two lugs of the same pair that face each other, the edges of the slot defined between said lugs are situated at the bases of their respective connection portions. Even if, during the tightening, a lug tends to be deformed, this deformation does not directly influence the width of the above-mentioned slot, so that the tightening can nevertheless be performed by reducing said width. In addition, the tightening forces are applied in regions of the lugs that are remote from the belt portion, and thus do not tend to modify the circularity of the section of said belt portion.

When the tightening means use at least one bolt passing through the lugs, said bolt is guided in improved manner because, for each lug, it makes use of both of the bearings that are formed respectively in the connection portion and in the tightening wall.

Advantageously, the connection portion is curved, its concave side facing the tightening wall. Advantageously, the connection portion has, at its base, at least one protuberance in which the curvature of said portion is locally increased.

The fact that the connection portion is curved facilitates good distribution of the tightening forces. The zone of locally increased curvature at the base of the connection portion has been subjected to considerable work-hardening and is thus not deformed very much during tightening. In addition, that fact that both of the lugs situated facing each other have protuberances of this type makes it possible locally to reduce the width of the slot so as to bring the belt closer to a continuous, looped belt.

Advantageously, each of the lugs of said pair is equipped with reinforcement means suitable for opposing deformation of said lugs under the action of said tightening means.

The presence of said reinforcement means makes it possible to push back the plastic deformation limit of the lugs and to avoid the effects of flattening due to said lugs bending.

The reinforcement means are preferably disposed in the space formed between the connection portion and the tightening wall and preserve the dimensions of that space, i.e. they prevent the tightening wall and the connection portion from coming too close together, which would result in the lug flattening onto itself.

In a first embodiment, the reinforcement means comprise a reinforcement insert disposed in the space formed between the connection portion and the tightening wall.

Said reinforcement insert can be a part made very simply and disposed in the internal space of a lug prior to putting the tightening means in place. If said tightening means include a bolt as indicated above, said insert has a configuration enabling said bolt to pass through it, e.g. it is provided with a notch or with a hole.

In a second embodiment, the reinforcement means advantageously comprise a spacer formed in one piece with the lug. This embodiment offers the advantage of avoiding manufacturing and handling an additional part.

In particular, the reinforcement means comprise at least one spacer extending from the tightening wall towards the connection portion.

Thus, the reinforcement means advantageously comprise two spacers, formed by flanges of the tightening wall folded back towards the connection portion in a manner such that the free ends of said flanges are suitable for co-operating with said portion, and/or a spacer folded back towards the connection portion from the end of the tightening wall facing the belt portion, in a manner such that the free end of said spacer is suitable for co-operating with the connection portion.

In a variant, the reinforcement means may comprise at least one spacer that extends from the connection portion towards the tightening wall. For example, it can be a tongue cut out from the connection wall and folded back relative thereto so that its free end is situated facing the tightening wall.

In a particular application, the device of the invention serves for coupling together in leaktight manner two smooth tubes disposed end-to-end, and it further comprises a sealing ring suitable for being disposed in the sleeve for surrounding the facing ends of the two tubes.

Naturally, other applications are possible, e.g. clamping a pipe that is fitted over a tube.

BRIEF DESCRIPTION OF THE DRAWINGS

The invention can be well understood and its advantages appear more clearly on reading the following detailed description of an embodiment shown by way of non-limiting example. The description refers to the accompanying drawings, in which.

DESCRIPTION OF THE PREFERRED EMBODIMENTS

Figure 1:
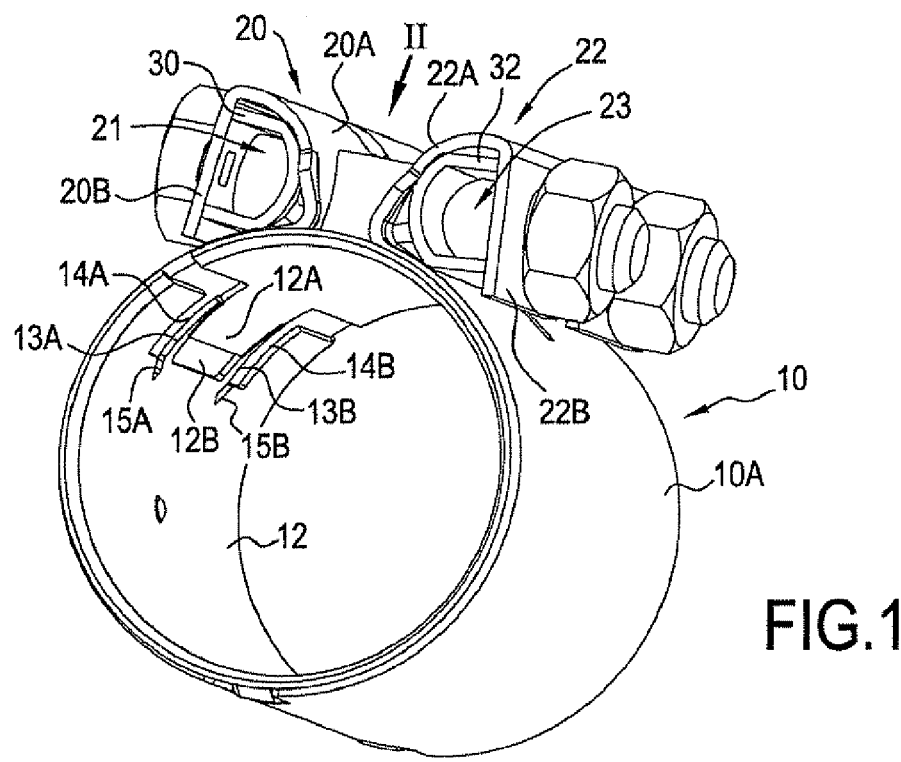
FIG. 1 is a perspective view of a first embodiment of a collar of the invention.
Figure 2:
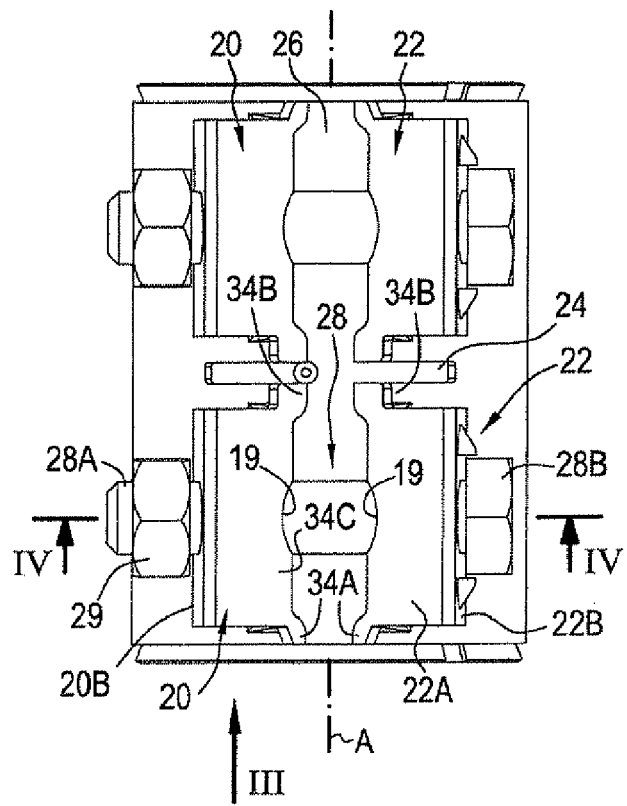
FIG. 2 is a view from above of the FIG. 1 collar seen looking along arrow II.

The clamping device of FIGS. 1 and 2 comprises a collar 10 inside which a sealing ring 12 is disposed for the purpose of surrounding the facing ends of two smooth tubes, coupled together in leaktight manner by means of said device. The sealing ring can be implemented in the manner known by Patent Application EP 1 181 477. However, advantageously, as shown in FIG. 1, its ends are provided respectively with a male shaped portion 12A and with a female shaped portion 12B, which receives the male shaped portion during tightening and which is defined between two contact tabs 13A and 13B. The leaktight contact is established on the contact edges of the contact tabs 13A and 13B that can be deflected during the tightening so as to facilitate penetration of the male shaped portion into the female shaped portion. Setbacks 14A and 14B facilitating this deflecting are advantageously provided on the sides of the tabs 13A and 13B that face the notch 12B that forms the female shaped portion. In order to facilitate this deflecting in the appropriate direction, nicks 15A and 15B are advantageously formed in the bases of the tabs.

The present patent application concerns itself with the particular shape of the tightening lugs of the collar and with the reinforcements for said lugs. As can be seen in FIGS. 1 and 2, the collar has at least one pair of lugs 20, 22 disposed facing each other. In this example, and as shown in FIG. 2, the collar has two pairs of lugs 20, 22 between which a slot 24 extending transversely to the axis A of the collar is formed, for the purpose of decoupling deformation of the lugs in the two pairs during tightening.

In this example, the lugs of the same pair are formed by folded-back portions of the respective ends of the strip that forms the collar. A longitudinal slot 26, i.e. a slot that extends parallel to the axis A, is provided between the lugs of each pair. It can be understood that, during tightening, the width of said slot decreases.

For each pair of lugs, the tightening means shown comprise a bolt 28 and a nut 29 co-operating with the threaded shank 28A of the bolt, the nut co-operating with one of the lugs 20 in the pair, while the head 28B of the shank co-operates with the other lug 22.

Figure 3:
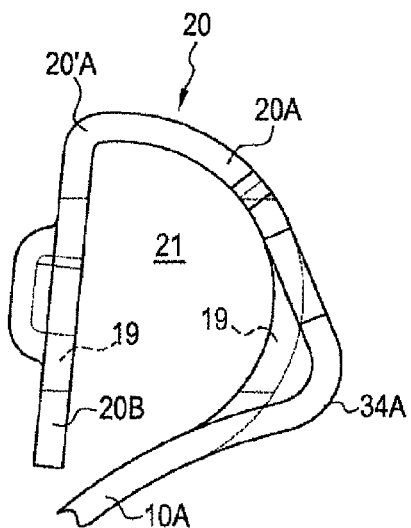
FIG. 3 is a detail view seen looking along arrow III of FIG. 2.

With reference to FIG. 3, the shape of the lug 20 is explained in more detail, it being understood that the shape of the lug 22 is substantially analogous, being substantially symmetrical about the midplane of the slot 26.

The lug 20 has a connection portion 20A via which it is connected to the belt portion 10A of the collar, which connection portion is upstanding relative to said belt portion, and a tightening wall 20B which is folded back towards said belt portion. A space 21 is formed between the connection portion and the tightening wall, thereby forming the above-mentioned cavity. The connection portion 22A, the tightening wall 22B of the lug 22, and the cavity 23 formed in said lug, are also shown in FIGS. 1 and 2.

For each lug, the tightening wall is that portion of the lug with which the tightening means come into engagement. Thus, the nut 29 is in abutment against the tightening wall 20B of the lug 20, and the head 28B of the bolt 28 is in abutment against the tightening wall 22B of the lug 22. Naturally, the tightening walls and the connection portions are provided with holes 19 that are aligned with one another so as to enable shank of the bolt to pass through them.

The connection portion 20A or 22A is curved, its concave side facing towards the tightening wall.

As can be seen more clearly in FIGS. 2 and 3, at its base, the connection portion of each lug has two protuberances 34A and 34B, in which protuberances the curvature of said connection portion is locally increased. In this example, for each lug, the two protuberances 34A and 34B are disposed at respective ones of the two axial ends of the lug, while an intermediate portion 34C extending over almost the entire length of the lug is provided between the two protuberances. It is indicated above that the connection portion is curved. Said connection portion advantageously has a curvature that is substantially constant from its base to its vertex 20'A (at which it is connected to the tightening wall 20B), except in the protuberances 34A and 34B where the curvature is locally increased. As can be understood by considering FIG. 2, insofar as the protuberance portions of the two lugs in the same pair are facing each other, they locally decrease between them the width of the slot 26. It can be seen in FIGS. 3 and 4 that the circularity of the belt portion 10A of the collar is maintained in the protuberance portions 34A and 34B, almost to the vertices of said protuberance portions. Thus, the bearing force exerted by the belt of the collar on the object(s) to be clamped is distributed substantially over a closed circle while the collar is being tightened.

Figure 4:
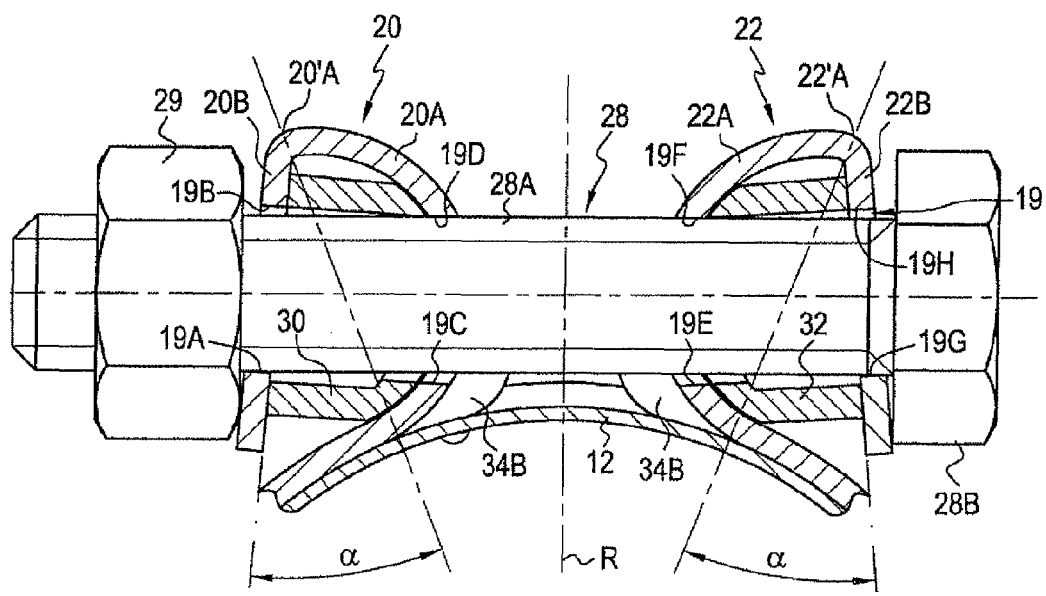
FIG. 4 is a section view on line IV-IV of FIG. 2.

FIG. 4 makes it possible to understand more clearly the advantage of the shape of the lugs of the invention.

It can be seen that the lugs 20 and 22 are inclined slightly backwards, i.e. their respective tightening walls are inclined at an angle a approximately in the range 20° to 40°, in particular in the vicinity of 30°, relative to the radii of the belt portion that pass through the vertices 20'A, 22'A, in the direction going away from each other towards their ends opposite from their connection portions. The shank of the bolt is substantially perpendicular to a mid-radius 4 of the belt portion, which mid-radius is contained in a plane of symmetry between the lugs, from which plane the tightening walls of the lugs diverge slightly, e.g. at approximately in the range 2° to 10°, going towards their free ends.

Under these conditions, it can be seen that the shank of the bolt bears on the inner edges 19A and 19G (closer to the center of the belt portion) of the holes 19 in the tightening walls 20B and 22B, and on the outer edges 19D and 19F of the connection portions 20A and 22A), while a small amount of clearance is observed on the other edges 19B, 19C, 19E, and 19H of said holes. Thus, the shank of the bolt acts as a beam, on which the edges of the holes 19 react, thereby contributing to avoiding excessive deformation of the lugs, but not preventing the tightening walls from straightening up to become approximately parallel to the radius R at the end of,tightening (not shown), thereby improving the extent to which the head of the bolt and of the nut bear against said walls.

Figure 5:
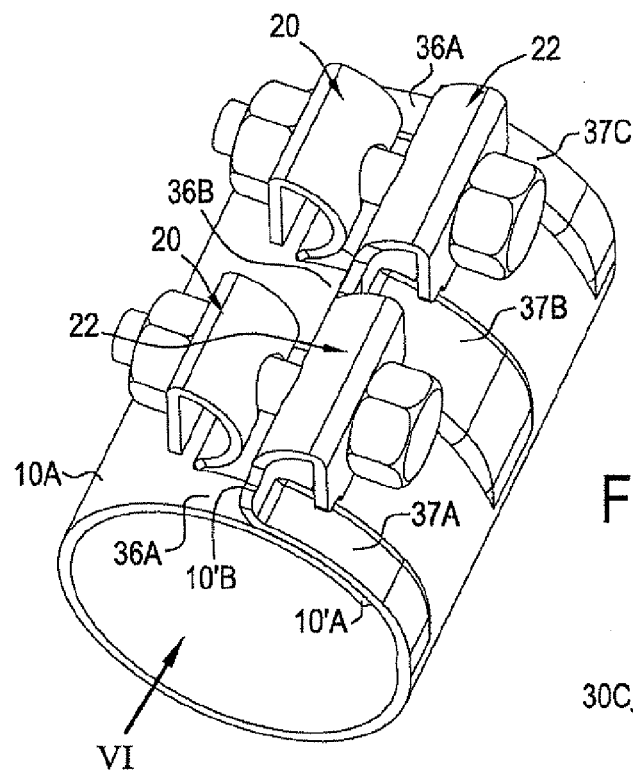
FIG. 5 is a perspective view of a variant of the collar.
Figure 6:
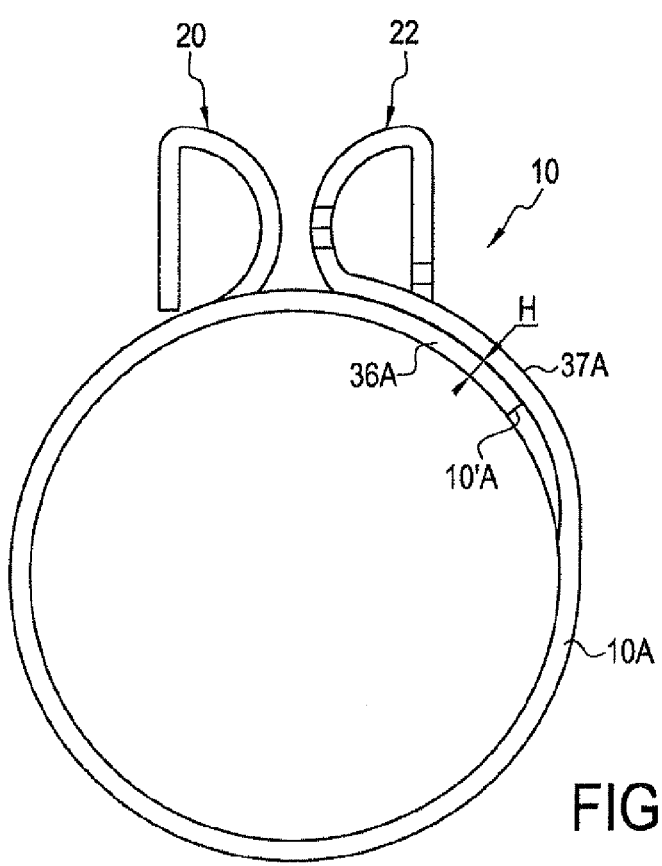
FIG. 6 is an end view of this collar seen looking along arrow VI.

FIGS. 5 and 6 show a variant embodiment of the collar, in which tines that extend from one end of the collar under the other end ensure that the belt bears with continuity against the object to be clamped.

The first lug 20 of a pair of lugs is formed by a portion of material folded back from the first end 10'A of the strip of which the collar is formed by the strip being looped on itself. More precisely, in order to form the lug, two slots extending along the circumference of the collar, i.e. in the same direction as the length of the strip that forms the collar, are formed from the free end of the strip. The material extending between the two slots is folded back to form the lug 20, while the rest of the end is looped with the strip to from the belt of the collar. Thus, the lug 20 is formed between two tines that extend along the circumference of the belt portion 10A that they extend beyond the lug 20. In the example shown, insofar as the collar has two pairs of lugs, three tines are thus formed, namely one tine 36A between one axial end of the collar and a first lug 20, one tine 36B between the two lugs 20, and one tine 36C between the second lug 20 and the other axial end of the collar. In order to receive said tines in a manner such that the inside periphery of the collar is circular, bulges 37A, 37B, and 37C are formed at the second end 10'B of the strip in which the collar is formed, under the lugs 22. The inside height H of said bulges corresponds substantially to the thickness of the strip, so that, as shown in FIG. 6, a tine can be received in each bulge, thereby maintaining the circularity of the inside periphery of the collar. In this example, insofar as three tines are formed, three bulges suitable for receiving them are thus formed.

As can be seen in FIGS. 1 and 4, each of the lugs is equipped with reinforcement means 30 or 32 disposed in a cavity 21 or 23 provided inside the lug for the purpose of preventing said lug from being flattened.

Figure 7A:
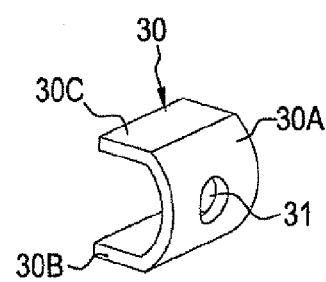
FIGS. 7A and 7B are perspective views showing embodiments of the reinforcement means constituted by an insert.

In a first possibility shown in the figures, said reinforcement means are, for each lug, constituted by an insert disposed in the above-mentioned cavity. More precisely, each of the inserts 30, 32 that serve to reinforce the lugs can be in the form of a trough having its web 30A disposed against the connection portion 20A of the lug in which said insert (FIG. 7A) is received. The trough is substantially U-shaped in cross-section, with a convex web, whose curvature is matched to the mean concavity of the connection portion of the lug. The two end walls 30B and 30C forming the two flanges of the U-shape are substantially parallel and are disposed such that the inside face of the tightening wall of the lug in which the insert is disposed can come to co-operate in abutment against the free ends of said walls.

Insofar as the tightening means used include bolts, the web portion 30A of the trough forming the insert is provided with a hole 31 enabling the bolt to pass through said web portion.

Figure 7B:
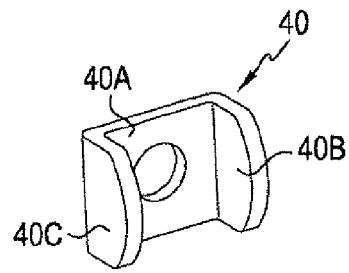

FIG. 7B shows a variant embodiment, in which the insert 40, which can also be disposed in the lugs 20 or 22 has a web portion that is substantially plane 40A and that is designed to be disposed against the inside face of the tightening wall of the lug in which the insert is disposed, and two flanges 40B and 40C that are folded back relative to the web portion and whose free ends are curved, so as to be suitable for co-operating with the inside face of the connection portion 20A or 20B of the lug that is concave.

Figure 8:
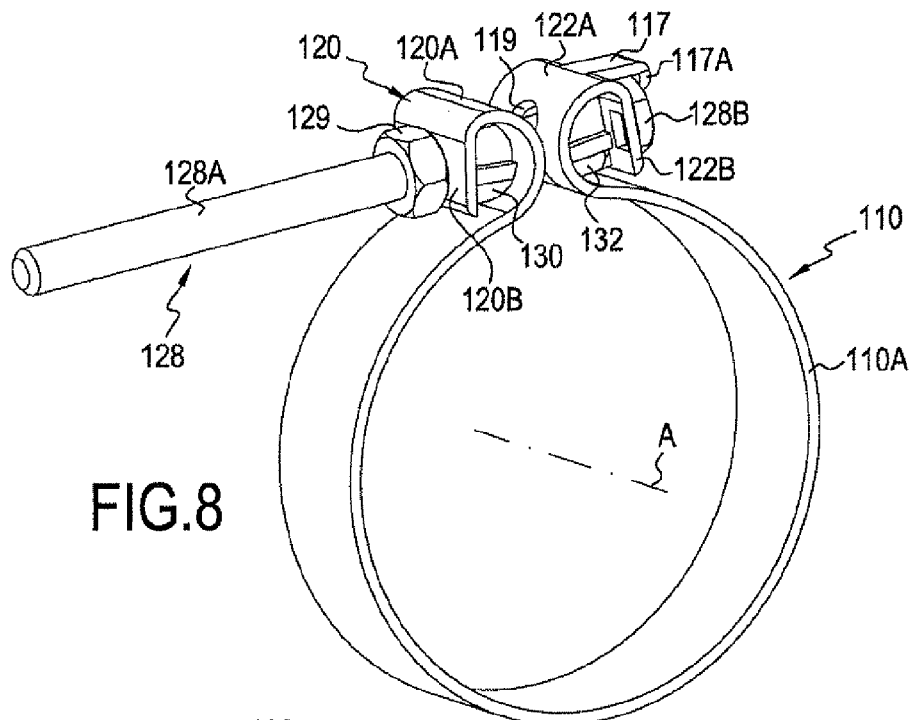
FIG. 8 is a perspective view of a variant of a collar.

A variant embodiment of the invention is described below. With reference firstly to FIG. 8, it can be seen that the collar has a belt portion 110, with two lugs 120 and 122 disposed facing each other. In this example, a collar is shown that is designed, for example, for clamping a pipe or a tube, and in which the width of the belt (as measured along the length of the axis A of the collar) is smaller than in FIG. 1 and thus has a single pair of lugs 120 and 122. Since the tightening also takes place by means of a nut-and-bolt system, the nut 129 is shown, as is the bolt 128 with its shank 128A and its head 128B.

As in FIG. 1, the lugs are raised relative to the belt portion 110A of the collar. Cavities are also formed inside the lugs, each of which, as in FIG. 1, has a connection portion 120A or 122A via which it is connected to the belt portion of the collar, which connection portion is upstanding relative to said belt portion, and a tightening wall 120B or 122B.

The connection portions and the tightening walls are provided with aligned holes 119 for enabling the shank of the bolt to pass through them.

In this variant embodiment, the reinforcement means for reinforcing each lug comprise a spacer formed integrally with said lug. In this example, said reinforcement means comprise at least one spacer that extends from the tightening wall to the connection portion. More precisely, as can be seen in FIGS. 9A and 9C, the spacer 130 of the lug 120 is folded back, into the internal space 121 in the lug, towards the connection portion 120A from that end 120' of the tightening wall 120B that is facing the belt portion 110A.

Thus, the spacer 130 can merely be formed by an end portion that is folded back substantially at right angles relative to the tightening wall 12DB. However, in the advantageous example shown, the spacer is itself stiffened by curved-up flanges 130A and 130B. In order to form these flanges, aligned slots that are parallel to the axis A of the collar are provided from the two opposite edges of the strip of which the collar is formed, at the end 120' of the tightening portion. Between the slots, a non-split portion is preserved that forms the attachment of the spacer to the tightening wall. The flanges 120A and 120B are then folded back so that, in section parallel to the axis A of the collar, the spacer is substantially trough-shaped. In order to reinforce the stiffening of the spacer further, the edges of the flanges 130A and 130B can have ribs or grooves, or indeed, as in the example shown, setbacks 130'A, 130'B. Naturally, the distance between the folded-back flanges 130A and 130B makes it possible for the bolt to pass between the flanges, the spacer having the shape of a longitudinal trough for receiving the shank of the bolt.

The free end 130C of the spacer 130 is disposed against the inside face of the connection portion 120, with which face it can thus co-operate to oppose flattening of the lug. In order to take account of the concavity of the connection portion, said free end is shaped in a manner such that the length of the spacer is larger in the region of the edges of the folded-back flanges than in the central region of the dished bottom of the spacer.

Figures 9A, 9B:
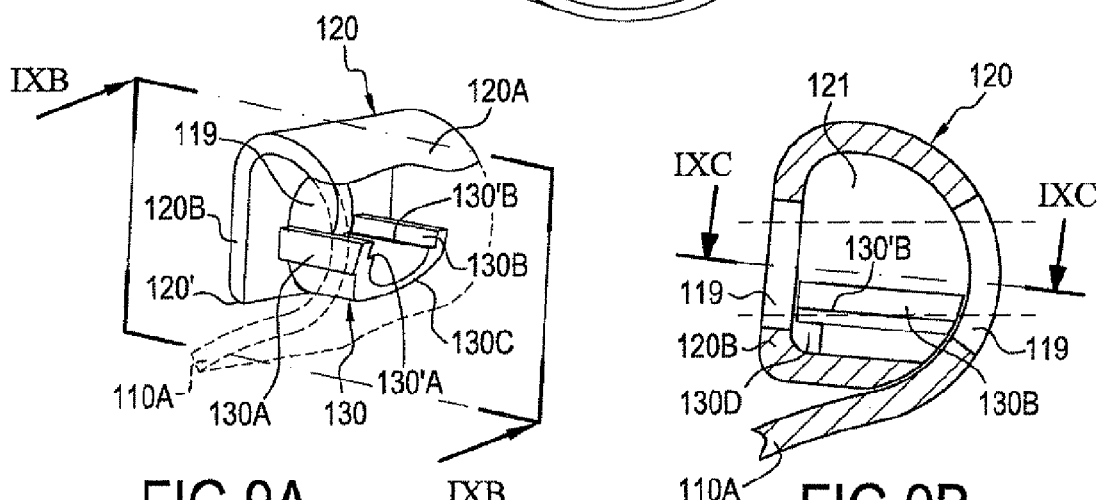
FIG. 9A is a perspective view with a cutaway, showing the implementation detail of a lug of this collar.
FIG. 9B is a section view on the plane IXB-IXB of FIG. 9A.
Figure 9C:
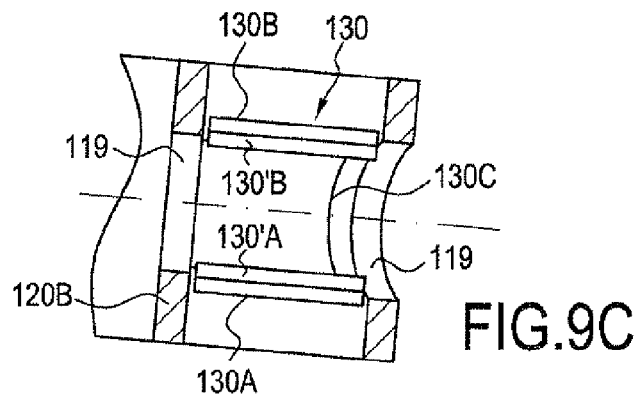
FIG. 9C is a section view on the plane IXC-IXC of FIG. 9B.

The slots making it possible for the flanges to be folded back can be mere cuts made in the strip, or indeed they can have locally widened portions in the zones in which the flanges are attached to the web portion of the spacer as can be seen at 130D in FIG. 9B. The spacer 132 is formed in the same way as the spacer 130, by being folded back into the internal space 123 of the lug 122 from the tightening wall 122B thereof.

Figure 10:
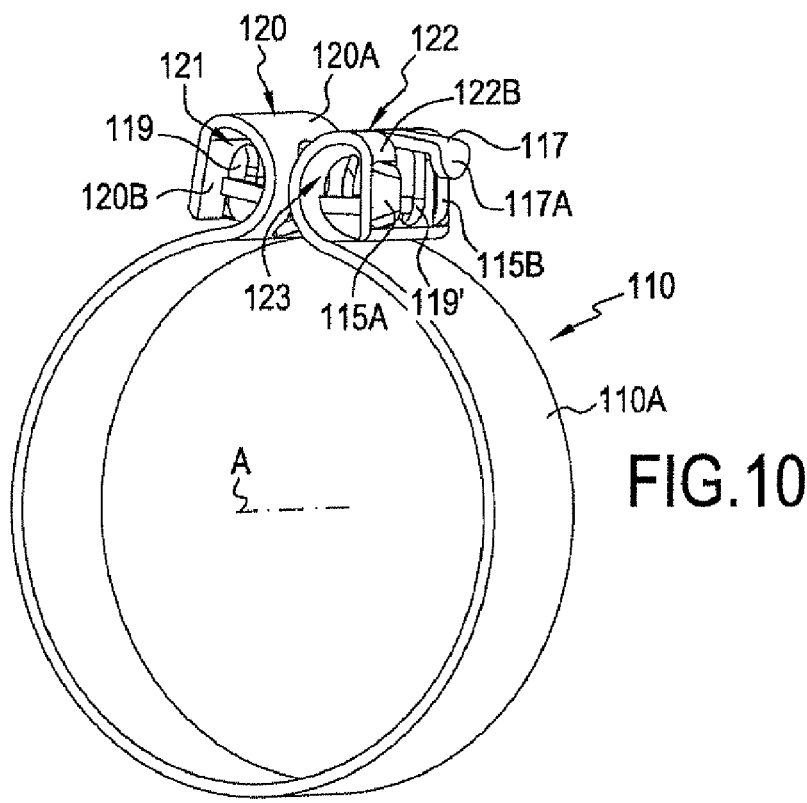
FIG. 10 is a perspective view of the same collar, without the tightening means.

In the embodiment shown in FIGS. 8 to 10, the collar is provided with means for wedging the head of the bolt while it is being tightened. More precisely, as can be seen in FIGS. 8 and 10, the portion of the lug against which the head of the bolt co-operates, i.e., in this example, the tightening wall 122B of the lug 122, has at least one wedging projection for co-operating with an adapted shape, in particular a flat, on the head of the bolt. In this example, two wedging projections 115A and 115B are formed in the tightening wall in a manner such that they project from the outside of said tightening wall. These projections are advantageously constituted by punched-out portions, i.e. in the region facing that portion of the head of the bolt with which they co-operate, each of them has a wedging edge cut out from the strip.

In the example shown in FIG. 8, the head of the bolt has a six-sided shape, two opposite flats of which come against the wedging edges of the projections 115A and 115B. In general, it is advantageous for the device to have means for wedging one of the elements constituted by the head of the bolt and by the nut, against the lug against which said element is disposed.

In order to retain the bolt against the tightening wall 122B, the lug 122 has a retaining catch 117 which extends from the top of the lug, above the head of the bolt, and whose free end 117A is folded back against the end face of the head, after said head has been put in place. Mention is made above of the presence of holes 119 for enabling the shank of the bolt to pass through the lugs. The hole through the connection wall 122B of the lug 122 is formed by a cutout 119T from which the tab 117 is raised. Conversely, it is possible to choose to retain the nut by means of an analogous retaining catch.

Figure 11:
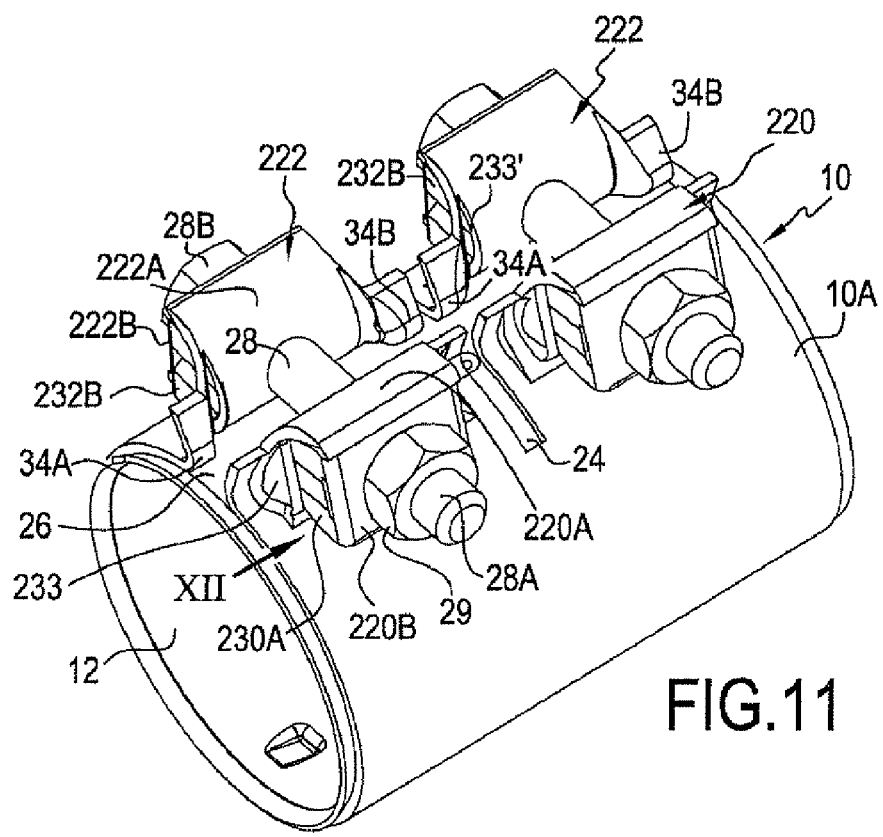
FIG. 11 is a perspective view of a variant of a collar.
Figure 12:
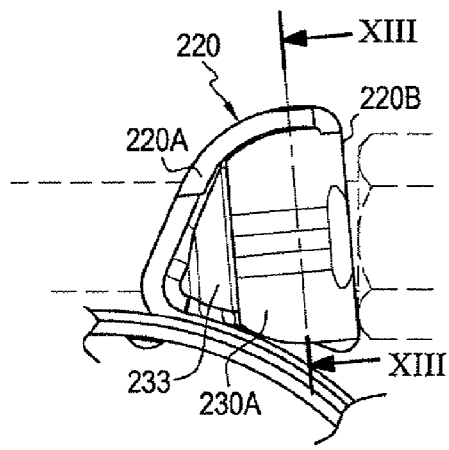
FIG. 12 is a detail view seen looking along arrow XII of FIG. 11.
Figure 13:
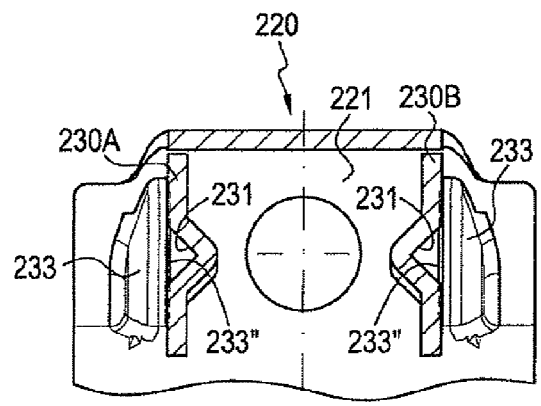
FIG. 13 is a section view on plane XIII-XIII of FIG. 12.

A description follows of FIGS. 11 to 13 which show a variant embodiment of the invention that also uses reinforcement means that are formed integrally with the lugs. It is a collar of the same type as the collar of FIG. 1, and like numerical references are used for the portions that remain unchanged.

In this variant, the lugs 220 and 222 are modified so that their reinforcement means are formed by spacers formed integrally with them. Each lug has a connection portion 220A or 222A and a tightening wall 220B or 222B that are analogous to the connection walls and tightening walls of FIG. 1. For each lug, the reinforcement means comprise two spacers that extend from the tightening wall towards the connection portion.

More precisely, with reference, in particular, to FIG. 13, for one lug 220, it can be seen that the spacers are formed by flanges 230A and 230B of the tightening wall 220B that are folded back towards the connection portion 220A into the internal space 221 of the lug. The spacers 222 are formed in the same way, only the flanges 232B of the lugs 222 being shown in FIG. 11.

Thus, the free ends of the flanges are situated against the inside face of the connection portion, and they can thus co-operate with each other so as to oppose flattening of the lug, i.e. so as to oppose the tightening wall and the connection portion moving closer together.

The flanges forming the spacers advantageously have stiffening means. In this example, said stiffening means are constituted by grooves 231 that are substantially parallel to the length of the flanges, as measured in the length direction of the shank of the bolt co-operating with the lug in question. The grooves extend over the entire length of the flanges, and, in this example, they are recessed relative to the outside faces of the flanges, which faces are opposite from the shank of the bolt that is situated between said flanges. Naturally, an inverse shape, in which the grooves are recessed as from the inside faces of the flanges is also quite possible to imagine.

As can also be seen in FIGS. 11 to 13, the device includes means for wedging the spacers relative to the connection potion. In this example, insofar as two flanges equip each lug, two wedges are thus provided. In the example shown, each flange is wedged by a projection 233 of the connection portion that projects relative to the tightening wall. Advantageously, each projection is formed by a punched-out portion. Thus, a cutout 2331 is formed in the lug (see lug 222 in FIG. 10) so that, once it has been punched out, the projection has a clear-cut edge 233" (see FIG. 13) against which the flange 230A or 230B that it wedges is situated.

For each flange, the projection is situated on the outside of the flange, i.e. on the side opposite from the shank of the bolt. It thus prevents the flange from tending to move away from the other flange of the same lug. Naturally, the projections 233 are formed after the flanges forming the spacers have been folded back.

Figure 14:
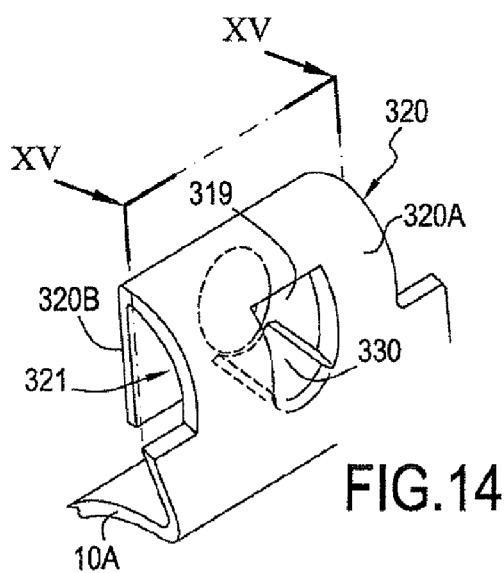
FIG. 14 is a perspective view of a lug, showing a variant.
Figure 15:
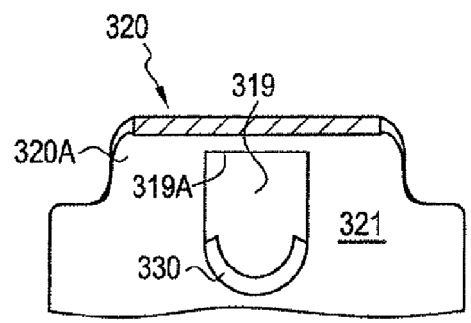
FIG. 15 is a section view on the plane XV-XV of FIG. 14.

A description follows of FIGS. 14 and 15 which show another variant of the second embodiment. For simplification reasons, these figures show a single lug 320 only that can be analogous to the above-described lugs except that it has a different spacer. The reinforcement means of this lug comprise a spacer formed by a tongue 330 that is cut out of the connection portion 320A of the lug and that is folded back into the internal space 321 so as to extend towards the tightening wall. When the bolt is in place in the lug, said tongue extends substantially parallel to the shank of said bolt. Advantageously, it is disposed between the bolt and the base of the connection portion 320A, i.e. between the bolt and the belt 10A of the collar.

Advantageously, when the tongue is folded back as shown in FIGS. 14 and 15, the cutout for the tongue that is folded back in this way forms an opening 319 for passing the shank of the bolt. As can be seen more clearly in FIG. 15, the tongue is advantageously concave in order to form a trough for the bolt, this concavity making it possible to increase the rigidity of the tongue, i.e. to oppose the tongue folding lengthwise. The free end of the tongue advantageously has a rectilinear shape as seen from above, defined by the top edge 319A of the opening 319. Thus, this free end rests on the inside face of the tightening wall 320B while matching the shape of said tightening wall.

The presence of the tongue 330 locally reduces the quantity of material in the connection portion and thus reduces its strength slightly. In this variant, the reinforcement means can be formed without adding any material to the collar, and thus while preserving a lightweight structure for said collar.

A description follows of FIGS. 16 to 19 which show variant embodiments of the invention, inspired by the variant embodiments of FIGS. 8 to 10.

Figure 16:
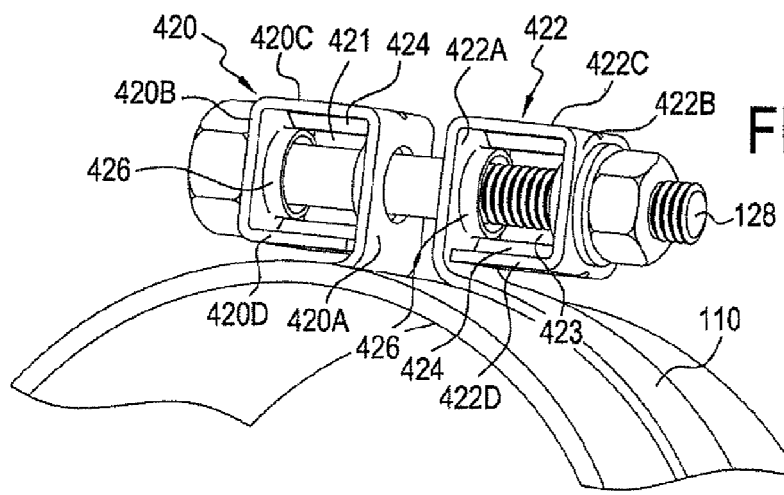
FIGS. 16 and 17 are fragmentary perspective views of variants of the collars.

In FIG. 16, the lugs 420, 422 as raised relative to the belt portion 110 of the collar are substantially square in shape as seen from the side.

More precisely, their connection portions 420A, 422A via which it is connected to the belt portion extend substantially radially while being in the shape of substantially plane walls, and their tightening walls 420B, 422B are also substantially plane and almost parallel to the connection portions. The tightening walls are connected to the connection portions via link walls 420C, 422C at right angles and the lugs are terminated by folded-back end walls 420D, 422D that are also at right angles and whose respective free ends abut against the inside faces of the connection portions.

The link walls 420C, 422C and the folded-back walls 420D, 422D are reinforced by internal projections 424 forming ribs that are substantially parallel to the shank of the bolt. The ends of said projections that are respectively adjacent to the inside faces of the connection portions and adjacent to the inside faces of the tightening walls can be in the form of clear-cut edges in abutment against said inside faces. Except for the free ends of the folded-back walls 420D, 422D, said clear-cut edges are obtained by transverse slots formed during or prior to the formation of the projections.

The folded-back walls 420D, 422D and the link walls 420C, 422C act as reinforcement means for reinforcing the lugs 420 and 422, which reinforcement means are formed integrally with said lugs, in the form of integrated spacers. It should be observed that the holes through the connection portions 420A, 422A and through the tightening walls 420B, 422B, through which holes the shank of the bolt 128 passes are edged by cylindrical bushes 426 that extend into the internal space 421, 423 of each lug. The bushes are formed by folded-back edges of the holes. They form bearings for guiding the bolt, improving its resistance to buckling during tightening of the collar.

Figure 17:
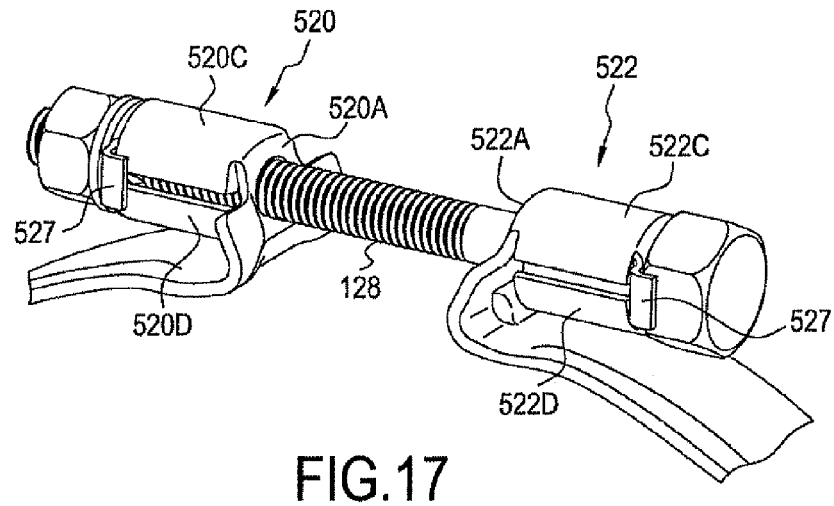
Figure 18:
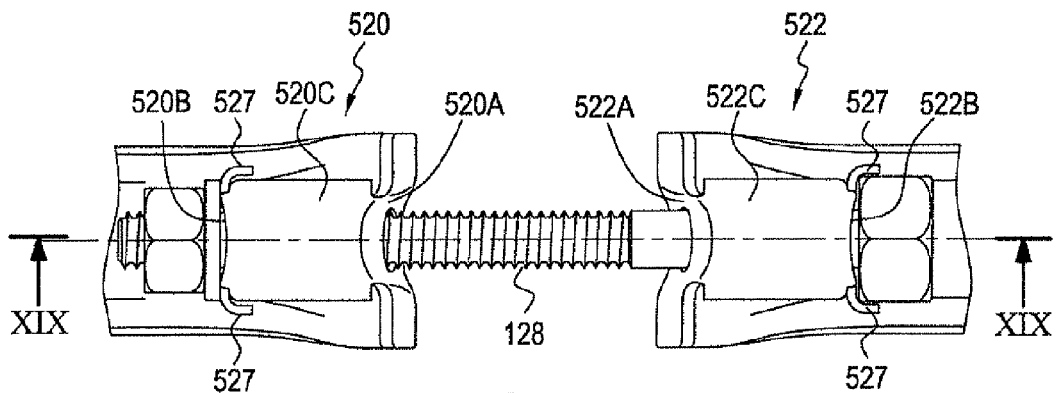
FIG. 18 is a view from above of the FIG. 17 collar.
Figure 19:
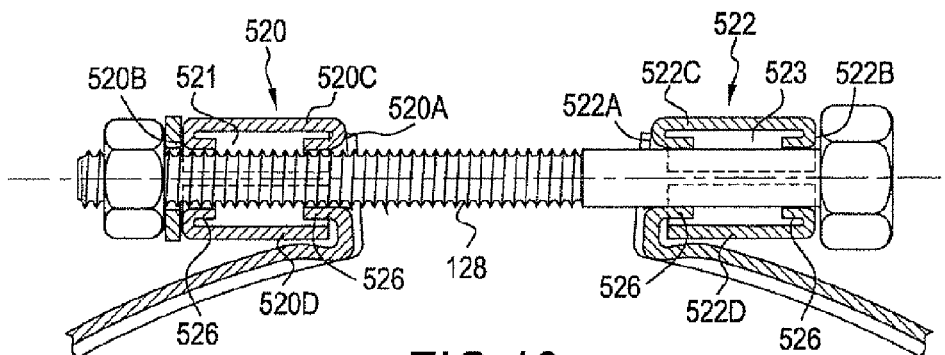
FIG. 19 is a section view of this collar on line XIX-XIX of FIG. 18.

In FIGS. 17 to 19, the lugs 520 and 522 are shaped in the form of cylinders parallel to the shank of the bolt 128.

More precisely, for each lug, the link wall 520C or 522C between the connection portion 520A or 522A and the tightening wall 520B or 522B has its longitudinal edges folded back towards the axis of the bolt in order to take up the shape of a semi-cylindrical trough whose concave side faces the axis of the collar.

For each lug, the end wall 520D or 522D that is folded back from the tightening wall 520B or 522B towards the connection portion 520A or 522A also has its longitudinal edges folded back towards the axis of the bolt in order to form a semi-cylindrical trough whose concave side faces away from the axis of the collar and which, together with the above-mentioned trough, completes the cylinder.

The trough-shaped end walls are implemented substantially like the spacers 130 and 132 of FIG. 8. In particular, slots making it possible to fold back their edges or flanges are formed where the end walls meet the clamping walls. Similarly, slots making it possible to fold back the edges or flanges of the link walls 520C, 522C are formed respectively where the link walls meet the connection portions and where they meet the tightening walls.

In each tightening wall and for each side of the hole through said wall, a tab 527 is obtained that is defined between the two slots situated on the same side of the hole, respectively above and below the tightening wall.

For the lug 522, the two tabs 527 are folded back to extend substantially parallel to the axis of the bolt while going away from the connection portion. By co-operating with flats of the element (bolt head or nut) in abutment against the lug, the tabs make it possible to wedge said element, thereby preventing it from moving in rotation.

For the lug 520, the tabs 527 are folded back against the flanges of the link wall and of the end wall, i.e. against the wall of the above-mentioned cylinder, thereby increasing the strength thereof. These tabs could also be cut out.

Like the variant shown in FIG. 16, the variant shown in FIGS. 17 to 19 can have internal cylindrical bushes 526 (see FIG. 19) that extend into the spaces 521, 523 provided, for each lug, in the cylinders, between the connection portion and the tightening wall. These bushes which, for each lug, can be formed from the tightening wall and/or from the connection portion, facilitate guiding the shank of the bolt and impart resistance to buckling to it.

The trough-shaped end and link walls of the lugs 520 and 522 form spacers that reinforce said lugs for the purpose of increasing their resistance to compression during tightening, and of transforming the tightening force into a strip-tensioning force.

The invention claimed is:

1. A clamping device comprising a collar, suitable for being disposed around objects to be clamped, and having at least one pair of projecting lugs, the device further comprising a tightening mechanism suitable for co-operating with lugs of said at least one pair to move them relative to each other in a manner such as to cause the diameter of the collar to decrease, each lug of said at least one pair having a connection portion via which said lug is connected to a belt portion of the collar, which connection portion is upstanding relative to said belt portion, and a tightening wall, with which the tightening mechanism comes into engagement and which is folded back towards the belt portion, a space being formed between the connection portion and the tightening wall, so that the tightening forces are applied to the tightening wall, remote from the connection portion of the lug that connects the lug to the belt portion,
wherein the connection portion is curved, a concave side thereof facing the tightening wall.

2. The device according to claim 1, wherein the connection portion has, at a base thereof which is close to the belt portion, at least one protuberance in which the curvature of said portion is locally increased.

3. The device according to claim 1, wherein each of the lugs of said at least one pair is equipped with reinforcement means suitable for opposing deformation of said lugs under the action of said tightening mechanism.

4. The device according to claim 3, wherein the reinforcement means comprise a reinforcement insert disposed in a space formed between the connection portion and the tightening wall.

5. The device according to claim 4, wherein the reinforcement insert is in the shape of a trough whose web is disposed against the connection portion.

6. The device according to claim 1, wherein at least one of the lugs of said at least one pair comprises at least one spacer formed in one piece with the lug for opposing deformation of said lug under the action of said tightening mechanism.

7. The device according to claim 6, wherein the at least one spacer extends from the tightening wall towards a free end of said spacer close to the connection portion.

8. The device according to claim 7, comprising two spacers, formed by flanges of the tightening wall folded back towards the connection portion in a manner such that the free ends of said flanges are suitable for co-operating with said connection portion.

9. The device according to claim 3, wherein the reinforcement means comprise a spacer folded back towards the connection portion from an end of the tightening wall that faces the belt portion, in a manner such that the free end of said spacer is suitable for co-operating with the connection portion.

10. The device according to claim 9, wherein the reinforcement means comprise a link wall between the connection portion and the tightening wall.

11. The device according to claim 10, wherein at least one of the elements constituted by said spacer and by said link wall is trough-shaped.

12. The device according to claim 3, wherein the reinforcement means of the lug comprise a spacer formed by a tongue cut out from the connection portion and folded back in a manner such as to extend towards the tightening wall.

13. The device according to claim 7, wherein the at least one spacer is wedged relative to the connection portion.

14. The device according to claim 13, wherein the connection portion has at least one projection projecting towards the tightening wall.

15. The device according to claim 1, wherein the tightening mechanism comprises at least one bolt whose head is disposed against a lug of the pair of lugs and a nut that is disposed against the other lug of the pair of lugs and that co-operates with the shank of the bolt.

16. The device according to claim 15, further comprising means for wedging one of the head of the bolt and the nut relative to the lug against which said element is disposed.

17. The device according to claim 16, wherein the tightening wall has at least one wedging external projection.

18. The device according to claim 15, wherein one of the lugs in the pair carries a retaining catch for retaining against it that one of the head of the bolt and the nut that co-operates with said lug.

19. The device according to claim 1 for coupling together in a leaktight manner two smooth tubes disposed end-to-end, further comprising a sealing ring suitable for being disposed in the collar for surrounding the facing ends of the two tubes.

20. A clamping device comprising a collar, suitable for being disposed around objects to be clamped, and having at least one pair of projecting lugs, the device further comprising a tightening mechanism suitable for cooperating with lugs of said at least one pair to move them in a manner such as to cause the diameter of the collar to decrease, each lug of said at least one pair having a connection portion via which said lug is connected to a belt portion of the collar, the connection portions of each lug of said at least one pair having a base which is close to said belt and which is provided with at least one protuberance, the protuberances of the respective connection portions facing each other so as to decrease between them a width of a slot formed between the respective lugs of the pair, wherein the connection portions are curved and have an increased curvature where the protuberances are located.

21. The clamping collar as claimed in claim 20, wherein the facing protuberances have vertices and a circularity of the belt portion is maintained in the protuberances, until close to their vertices.

* * * * *